Jan. 18, 1966    E. A. WOLICKI ETAL    3,230,371
NUCLEAR RADIATION DETECTION SYSTEM USING
A PLURALITY OF DETECTORS
Filed April 25, 1963
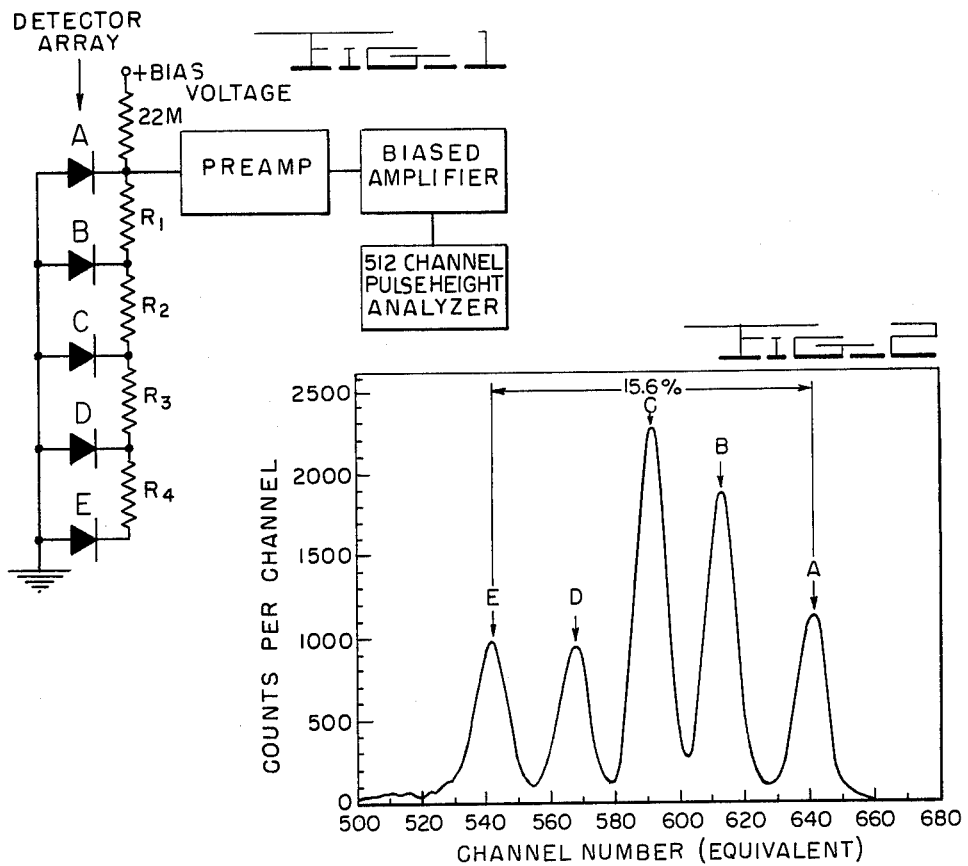
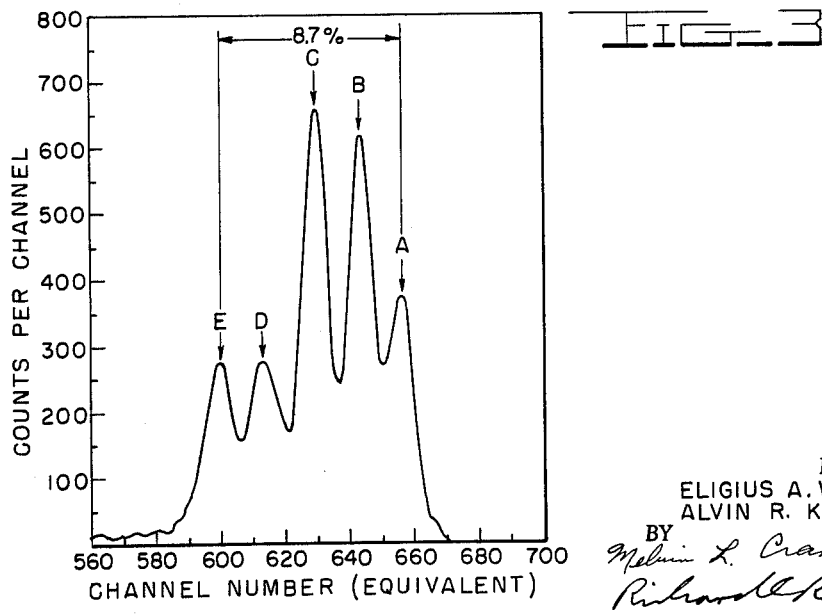
INVENTORS
ELIGIUS A. WOLICKI
ALVIN R. KNUDSON
BY
AGENT
ATTORNEY

United States Patent Office 3,230,371
Patented Jan. 18, 1966

3,230,371
NUCLEAR RADIATION DETECTION SYSTEM
USING A PLURALITY OF DETECTORS
Eligius A. Wolicki, Friendly, Md. (7537 Broadview Road, Washington, D.C.), and Alvin R. Knudson, 4705 Old Mill Road, Alexandria, Va.
Filed Apr. 25, 1963, Ser. No. 276,142
2 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention is directed to a multi-detector array and more particularly to a multi-detector array for detecting nuclear particles.

Heretofore nuclear detector systems have been used which include a plurality of detectors. Each detector had associated therewith a separate preamplifier and multi-channel pulse height analyzer with complex circuits for identifying the detectors that had measured an event. Such systems require many expensive pieces of equipment to obtain a desired end result of detecting nuclear particles especially when a plurality of detectors are used in the detection.

The present invention overcomes the disadvantages of the prior art systems by setting forth a system that includes a plurality of separately operated nuclear radiation responsive detectors all of which are associated with a single amplifier and multichannel pulse-height analyzer. Such a system simplifies the need of complex systems and yet provides suitable particle detection and identification of the detector doing the detecting.

It is therefore an object of the present invention to provide a simple, relatively inexpensive multi-detector nuclear particle detector system.

Another object is to provide a multi-detector system which employs a single amplifier and analyzer in combination with a plurality of detectors.

Still another object is to provide a single multi-detector system which will replace a plurality of single detector systems.

The nature of this invention as well as other objects and advantages thereof, will be readily apparent from considerations of the following specification relating to the annexed drawings in which:

FIG. 1 is a schematic and block diagram of a suitable detector system made in accordance with this invention;

FIGS. 2 and 3 are illustrations of different spectrums obtained by use of an alpha source and the circuit of FIG. 1 but using different valued resistors and biasing voltages.

The present invention includes a plurality of nuclear particle detectors connected electrically in parallel in an array with each detector connected between a resistor of a plurality of resistors connected in series. The resistors attenuate a signal from each detector relative to the detector preceding it in the array. The output signals are amplified by the same preamplifier and then directed into a biased amplifier and into a 512 channel pulse-height analyzer. The amplitude of the peaks of the spectrum recorded by the pulse-height analyzer are attributed to the voltage output pulses of a particular detector.

Now referring to the drawing, there is shown by illustration a preferred system representative of the present invention. The system includes a plurality of nuclear particle detectors such as RCA junction detectors, A, B, C, D, E each having an area of 5 mm.$^2$ and 1000 ohm-cm. resistivity. Only five detectors are shown for illustrative purposes; however, either more or less in number can be used depending on the number of detectors needed. However the system does have a limit in number of detectors that can be used and also the detectors used must have a high resolution. Each of the detectors is connected between one of a plurality of resistors $R_1$, $R_2$, $R_3$, $R_4$ connected electrically in series such that the series resistors attenuate the signal from each detector relative to the preceding detector in the array. The system is provided with a bias voltage through a surge resistor connected to the detector A and the series resistor $R_1$. A preamplifier such as an ORTEC 103 is also connected between the surge resistor and the first series resistor R, to which the output signals are directed from the detector array. The output of the preamplifier is directed to a biased amplifier and then the output of the biased amplifier is directed into a 512 channel pulse-height analyzer which sorts the voltage pulses out according to their amplitudes and produces a record such as shown in FIGS. 2 and 3.

In operation of the detector array, the series resistors are used to attenuate the signal from each detector relative to the detector preceding it in the array. Nuclear particles such as alpha particles striking a detector will produce a corresponding output signal from the detector. The output signal from detector A will feed directly into the input to the preamplifier whereas an output signal from either of the other detectors will pass through one or more resistors in series depending on the detector doing the detecting. The output signal from the appropriate detector will pass through the appropriate series resistor or resistors wherein the signal will be attenuated and then fed into the input of the preamplifier. The preamplifier amplifies the signal and eventually the signal is fed to the 512 channel pulse-height analyzer which records the voltage amplitude of the corresponding output signals from the appropriate detector. In this manner the signal amplitude can be used to identify which detector in the array has detected a particle. The spectrum illustrated in FIG. 2 is a copy of an actual record made using a $Po^{210}$ alpha source as the particle detected. In this array a bias voltage of 10 volts was used and the ohmic value of the series resistors was as follows: $R_1=1.0K$, $R_2=1.5K$, $R_3=1.2K$, $R_4=4.7K$. The different heights of the peaks A, B, C, D, and E are due to the fact that the corresponding detectors subtended different solid angles at the alpha source. The identification of the peaks with the corresponding detectors is clear.

The resolution corresponding to each detector in the array gets worse as the number of detectors is increased. This effect and the energy spectrum of the particles incident on the array combine to limit the maximum number, designated here as N, of detectors which may be used. It is important therefore to use detectors with high resolution. As a specific example, the limitation on N due to the incident particle energy spectrum will be discussed for an array placed in the image plane of a reaction-particle magnetic spectrometer. The extension of these considerations to other applications, for example to nuclear reaction angular distribution measurements, will be straightforward.

Assuming that only alpha particles and deuterons are incident on the array, if an alpha particle has energy E then the corresponding deuteron will have an energy of approximately $E/2$. Since the alpha peak due to the Nth detector must be above the deuteron peak due to the first detector in the array, the energy interval in the pulse height spectrum which can be used to store alpha pulses will be somewhat less than 0.5E. To maximize the number of detector, N, the separation between peaks must be reduced to a minimum. In FIG. 2 the energy interval used for the five detectors was 15.6% as shown. When the image of the particle group of interest spans several detectors in the array then it may be sufficient to measure only the combined area of several peaks. In this case the separation between peaks can be reduced to a minimum consistent with clear identification of just their tops. FIG. 3 shows the spectrum which resulted when an 8.7% energy interval was used for storing the five peaks. As shown the identification of the separate peaks is still quite good. For this measurement the bias voltage was 20 volts and the ohmic value of the resistors was as follows: $R_1=1.0K$, $R_2=2.2K$, $R_3=0$, and $R_4=4.7K$. Thus a plurality of detectors can be used with one amplifier system and multi-channel pulse-height analyzer for recording detection of particles detected when using a plurality of detectors.

Obviously many modifications and variations of the present invention are possible in the light of the above teachings. It is therefore to be understood that within the scope of the appended claims the invention may be practiced otherwise than as specifically described.

What is claimed is:

1. A multi-detector system which comprises:
   (a) a plurality of independent radiation responsive detectors connected electrically in parallel,
   (b) each of said detectors adapted to produce a separate and distinct electrical output due to incident radiation thereon,
   (c) a plurality of resistors connected electrically in series in which each of said plurality of resistors are electrically connected between the outputs of two of said plurality of detectors,
   (d) a preamplifier,
   (e) said preamplifier connected to the output of one of said detectors and to the electrical line including said plurality of series resistors to receive a signal from each of said radiation detectors to produce an amplified output,
   (f) a multi-channel pulse height analyzer for receiving the output signal from said preamplifier and recording the voltage output amplitude of inputs from said preamplifier,
   (g) said recorded amplitudes being characteristic of voltage outputs of a specific detector of said plurality of detectors, and
   (h) a bias voltage connected to said detectors and to said series resistors.

2. A multi-detector system for detecting nuclear particles which comprises:
   (a) a plurality of independent radiation responsive detectors connected electrically in parallel,
   (b) each of said detectors adapted to produce a separate and distinct electrical output due to incident radiation thereon,
   (c) a plurality of resistors connected electrically in series,
   (d) each of said resistors having a different value of resistance with one of each of said resistors connected between the outputs of two of said plurality of detectors,
   (e) an amplifier,
   (f) said amplifier being electrically connected to the output of an end detector of said plurality of detectors and to said electrical series resistor line to which said output of said end detector of said plurality of detectors is connected wherein said amplifier receives an output signal from each of said radiation detectors upon which radiation is incident and amplifies said received signals,
   (g) a multi-channel pulse height analyzer,
   (h) said pulse height analyzer arranged to receive the output from said amplifier and to record a record representative of the amplitude of said output signal from said amplifier,
   (i) said signal amplitude being characteristic of the voltage output from a specific detector of said plurality of detectors upon which radiation is incident, and
   (j) a bias voltage connected to said plurality of detectors and to said series resistors.

References Cited by the Examiner
UNITED STATES PATENTS

| | | | |
|---|---|---|---|
| 2,617,042 | 11/1952 | Wouters | 250—83.3 |
| 2,843,748 | 7/1958 | Jacobs | 250—83.3 X |
| 3,041,454 | 6/1962 | Jones et al. | 250—71.5 |
| 3,046,405 | 7/1962 | Emeis | 250—211 |

RALPH G. NILSON, *Primary Examiner.*

ARCHIE R. BORCHELT, *Examiner.*